(12) United States Patent
West et al.

(45) Date of Patent: *Feb. 1, 2011

(10) Patent No.: US 7,882,012 B1

(54) SYSTEM AND METHOD FOR ESTIMATING ORDER POSITION

(75) Inventors: Robert A. West, Chicago, IL (US); Ryan A. Andrews, Evanston, IL (US); Jens-Uwe Schluetter, Evanston, IL (US); David W. Garrison, Arlington Heights, IL (US); Michael J. Burns, Chicago, IL (US)

(73) Assignee: Trading Technologies International, Inc., Chicago, IL (US)

( * ) Notice: Subject to any disclaimer, the term of this patent is extended or adjusted under 35 U.S.C. 154(b) by 92 days.

This patent is subject to a terminal disclaimer.

(21) Appl. No.: 11/415,890

(22) Filed: May 2, 2006

Related U.S. Application Data

(63) Continuation of application No. 10/452,567, filed on May 30, 2003.

(51) Int. Cl.
*G06Q 40/00* (2006.01)

(52) U.S. Cl. .................................................. 705/37

(58) Field of Classification Search ................ 705/37
See application file for complete search history.

(56) References Cited

U.S. PATENT DOCUMENTS

| | | | |
|---|---|---|---|
| 5,006,983 A | 4/1991 | Wayne et al. | |
| 5,297,032 A | 3/1994 | Trojan et al. | |
| 6,278,982 B1 * | 8/2001 | Korhammer et al. | 705/36 R |
| 6,408,282 B1 * | 6/2002 | Buist | 705/36 R |
| 6,487,291 B1 * | 11/2002 | Walker et al. | 379/266.02 |
| 6,714,643 B1 * | 3/2004 | Gargeya et al. | 379/266.06 |
| 6,772,132 B1 | 8/2004 | Kemp, II et al. | |
| 6,845,361 B1 | 1/2005 | Dowling | |
| 6,987,578 B2 * | 1/2006 | Alexander | 358/1.15 |
| 7,127,424 B2 | 10/2006 | Kemp, II et al. | |
| 7,249,080 B1 * | 7/2007 | Hoffman et al. | 705/35 |
| 7,620,576 B1 | 11/2009 | Andrews et al. | |
| 2001/0032162 A1 | 10/2001 | Alsberg et al. | |
| 2002/0049086 A1 * | 4/2002 | Otsu | 463/42 |
| 2002/0073017 A1 | 6/2002 | Robertson | |

(Continued)

FOREIGN PATENT DOCUMENTS

WO   WO 00/62187 A2   10/2000

(Continued)

OTHER PUBLICATIONS

Pending U.S. Appl. No. 10/452,567, filed May 30, 2003.

*Primary Examiner*—James A Kramer
*Assistant Examiner*—Jessica L Lemieux
(74) *Attorney, Agent, or Firm*—McDonnell Boehnen Hulbert & Berghoff LLP

(57) ABSTRACT

A system and method for providing order queue position information are disclosed. In this application, market updates are received for a tradable object from at least one exchange. To the extent that the market updates do not include enough details to compute the queue position of a trader's working orders, estimation may be used. As a result, an order queue is generated to approximate a trader's order position in an exchange price order queue. An interface may be used to display the generated order queue estimation to the trader which provides valuable trading information.

19 Claims, 7 Drawing Sheets

U.S. PATENT DOCUMENTS

| | | |
|---|---|---|
| 2002/0138390 A1 * | 9/2002 | May .......................... 705/37 |
| 2003/0004853 A1 | 1/2003 | Ram et al. |
| 2003/0009411 A1 | 1/2003 | Ram et al. |
| 2003/0101128 A1 * | 5/2003 | Abernethy ................ 705/37 |
| 2004/0088242 A1 * | 5/2004 | Ascher et al. ............. 705/37 |
| 2004/0153377 A1 * | 8/2004 | Dallman .................... 705/27 |
| 2007/0136182 A1 | 6/2007 | Ketchum et al. |

FOREIGN PATENT DOCUMENTS

| | | |
|---|---|---|
| WO | WO 00/62187 A3 | 10/2000 |
| WO | WO 01/16582 A2 | 3/2001 |
| WO | WO 01/16582 C1 | 3/2001 |
| WO | WO 01/16852 A2 | 3/2001 |
| WO | WO 01/16852 C1 | 3/2001 |
| WO | WO 01/22315 A2 | 3/2001 |
| WO | WO 01/22315 A3 | 3/2001 |
| WO | WO 02/48945 A1 | 6/2002 |
| WO | WO 02/059815 A1 | 8/2002 |

* cited by examiner

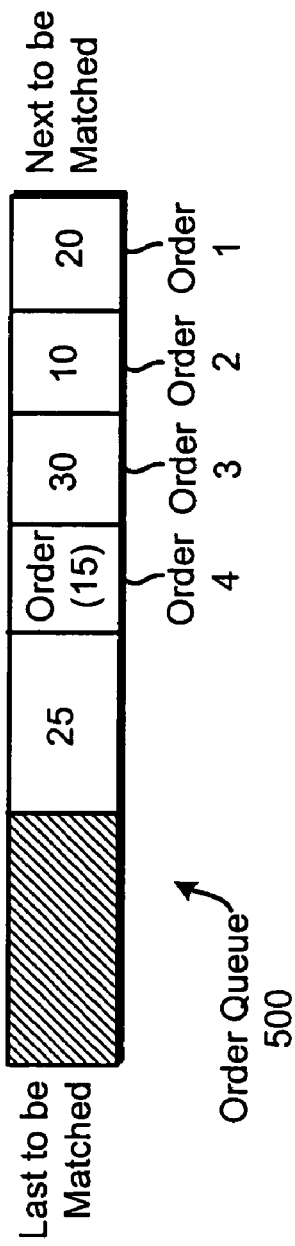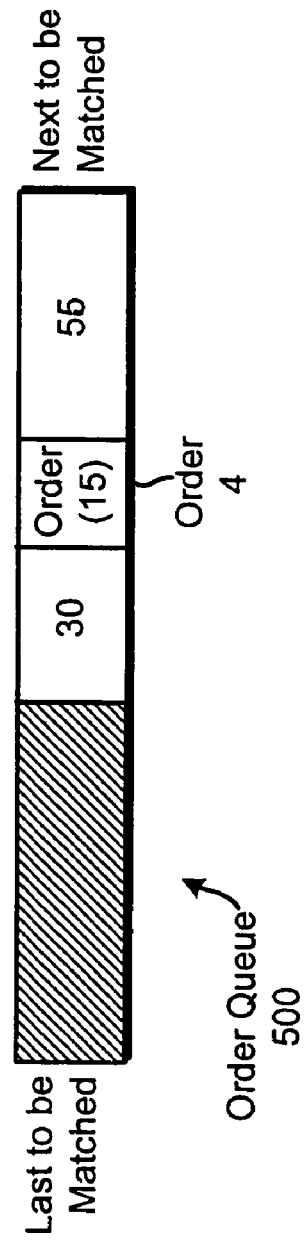

FIG. 10

SYSTEM AND METHOD FOR ESTIMATING ORDER POSITION

CROSS REFERENCE TO RELATED APPLICATION

This application is a continuation of U.S. patent application Ser. No. 10/452,567 filed May 30, 2003, entitled "System and Method for Estimating Order Position" the contents of which are fully incorporated herein by reference.

FIELD OF INVENTION

The present invention is directed towards electronic trading. Specifically, the present invention is directed to tools for trading tradable objects that can be traded with quantities and/or prices.

BACKGROUND

An electronic exchange typically provides an automatic matching process between traders, or more specifically, between buyers and sellers. Traders are connected to an electronic exchange by way of a communication link to facilitate electronic messaging between themselves and the exchange. Included in the messaging are buy and sell orders sent from the traders to the exchange. Of course, other types of well-known financial transaction messages are also communicated.

Generally, when a buy order or a sell order is submitted to an exchange, the exchange's logic checks the conditions associated with the order, for example price and quantity, and determines if a match exists. If a match does not exist, the exchange's logic prioritizes the order into an exchange order book with other orders of the same price. When the order conditions are satisfied in the market, or equivalently, a match exists, a trade occurs and trade information is then often relayed in some fashion to one or more client devices. To do this, the exchange would typically publish a data feed to the client devices to inform the traders of the most recent market changes.

The contents of the data feed, however, are often limited in information. Generally, the data feed only presents enough information to provide total aggregate quantities available at particular prices. In other words, an exchange usually provides in its data feed the total buy or the total sell quantity available in the market at a particular price level. Trading software installed on a computer can receive the data feed, and after that, the information contained in the date feed is displayed to a trader. Then, the trader attempts to use this information to spot opportunities in the market and to determine where to place orders. However, because this information is limited and oftentimes inadequate to fully characterize a market's activity, it can essentially force the trader to guess as to what is actually happening in the market. As a result, the trader may not be making the best possible trades.

Despite the limitations of the informational content provided by an exchange, traders want to characterize the markets to the best of their abilities. It is therefore desirable to offer tools that can provide a trader with more information to better assess a market at an electronic exchange. Such additional information may be helpful in, for example, spotting opportunities in the market and ultimately may be used to help traders make more informed and desirable trades.

BRIEF DESCRIPTION OF THE DRAWINGS

FIGS. 5-9 show graphical depictions of an order queue using varying alternative ways to estimate the trader's order position in the order queue; and FIG. 10 illustrates an example trading screen that utilizes a preferred embodiment of the present invention.

DETAILED DESCRIPTION

I. Order Queue Position Estimation Overview

An electronic exchange maintains an exchange order book that represents unexecuted buy and sell orders for a particular tradable object. A matching engine at the exchange attempts to match incoming orders to those orders resting in the exchange order book. If there is no match, the orders are preferably sorted by price and time priority. In particular, the exchange's logic sorts the orders into the appropriate price order queue where the orders rest until they are matched by the matching engine or until the orders are deleted or changed by the trader, for example. When orders are matched, changed, added, or removed from the price order queue, information regarding its change is generally broadcast to the client devices in the form of market updates. Market updates are an attempt to provide client devices with the ability to create their own order books that are coordinated with the exchange order book.

Practically speaking, however, market updates provided by most, if not all, electronic exchanges do not adequately describe the details of the exchange order book, and more specifically, the details of the price order queues. Generally, market updates in a data feed usually only present enough information to provide the total aggregate quantity available at a particular price level. In other words, a market update may only provide the total quantity in a particular price order queue, and they may not provide the actual number of orders resting in the queue or they may not indicate where a given trader's order position is within the price order queue. However, traders might want more detailed information such as the number of orders in the exchange order queue, the order sizes, and/or the order position in the price order queues to assist them, for example, in making better and more informed trades.

To assist traders in their quest for more information, the present invention provides an estimation of the trader's order position in a price order queue. The order position estimation may be displayed in any particular fashion, however, for sake of illustration some display examples are described herein. Additionally, the present invention may be utilized with the inventions set forth in U.S. Pat. No. 7,620,576, filed on Jan. 21, 2003, entitled, "Method and Apparatus for Providing Order Queue Information," the contents of which are incorporated herein by reference. The incorporated patent application describes a method and apparatus for estimating the number of orders in a price order queue and for estimating the size of each order.

II. Preferred System Architecture

Figure 1:
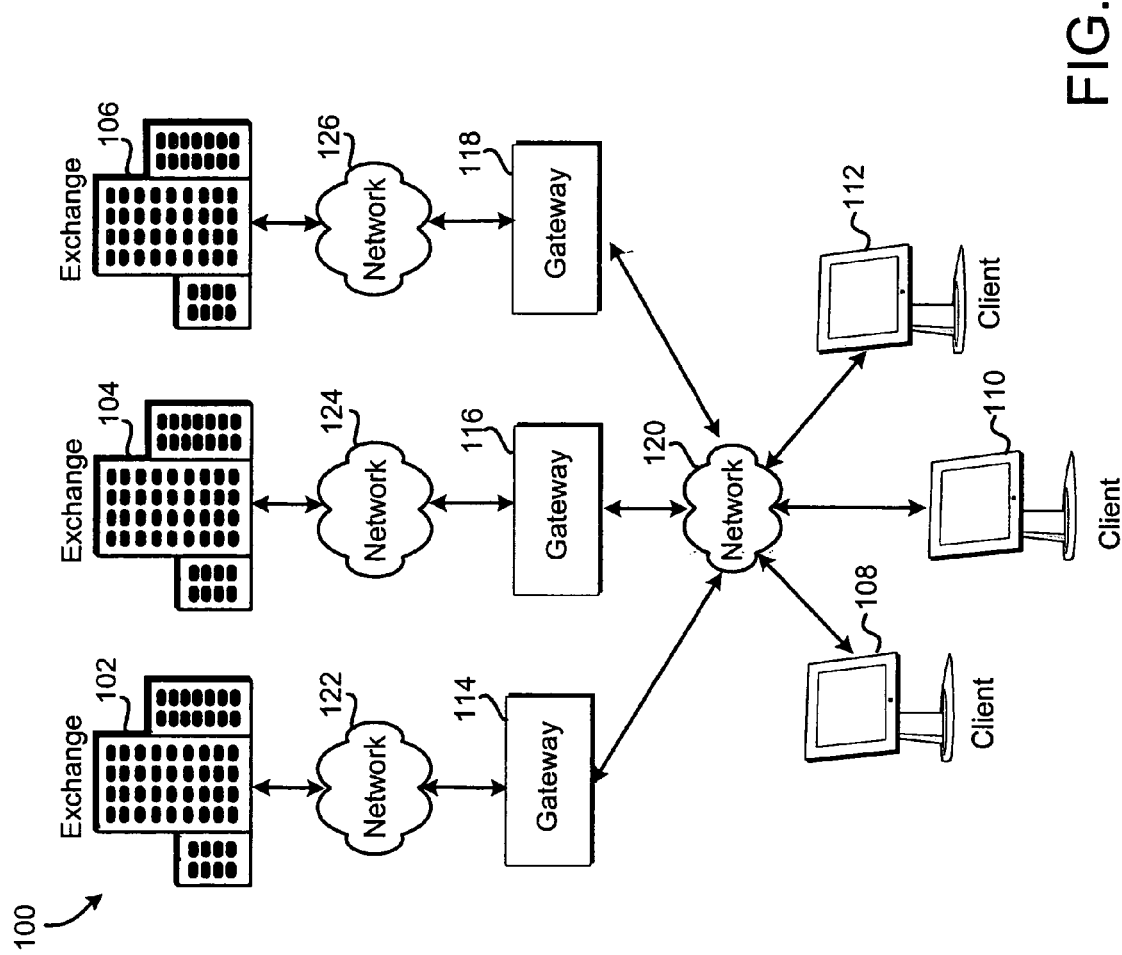
FIG. 1 illustrates an example system for linking one or more electronic exchanges to one or more client sites to facilitate electronic messaging between themselves.

FIG. 1 is a block diagram that illustrates an electronic trading system 100 in accordance with the preferred embodiments. The system 100 includes one or more exchanges 102, 104, 106 and one or more client devices 108, 110, 112. Intermediate devices such as gateways 114, 116, 118, routers (not shown), and other such types of network devices may be used to connect network 120 to networks 122, 124, 126 so that client devices 108, 110, 112 and exchanges 102, 104, 106 can communicate market information. It should be understood that the present invention is not limited to any particular system configuration. For example, networks 122, 124, and 126 could represent the same network, network 120 could represent the same network as networks 122, 124, and 126, or client devices 108, 110, 112 could connect separately to gateways 114, 116, 118. Of course, the preferred embodiments may be implemented on many other system configurations.

A. Exchange

Any of exchanges 102, 104, 106 may represent, for example, the London International Financial Futures and Options Exchange (LIFFE), the Chicago Board of Trade (CBOT), the New York Stock Exchange (NYSE), the Chicago Mercantile Exchange (CME), the Exchange Electronic Trading ("Xetra," a German stock exchange), or the European Exchange ("Eurex"), or any other exchange that participates in electronic trading. Exchanges 102, 104, 106 might also refer to other facilities, which include basic to more complex systems that automatically match incoming orders. These example exchanges and other exchanges are well known in the art. Communication protocols required for connectivity to one of these exchanges are also well known in the art.

Exchanges 102, 104, 106 allow traders to log onto a market to trade tradable objects. As used herein, the term "tradable objects," refers simply to anything that can be traded with a quantity and/or price. It includes, but is not limited to, all types of tradable objects such as financial products, which can include, for example, stocks, options, bonds, futures, currency, and warrants, as well as funds, derivatives and collections of the foregoing, and all types of commodities, such as grains, energy, and metals. The tradable object may be "real," such as products that are listed by an exchange for trading, or "synthetic," such as a combination of real products that is created by the user. A tradable object could actually be a combination of other tradable object, such as a class of tradable objects.

An exchange 102, 104, 106 can implement numerous types of order execution algorithms, sometimes the type of algorithm depends on the tradable object being traded. Preferably, the preferred embodiments can be adapted by one skilled in the art to work with any particular order execution algorithm. Some example order execution algorithms include first-in-first-out and pro rata algorithms. The first-in-first-out (FIFO) algorithm, used for some tradable objects listed with Eurex for example, gives priority to the first person to place an order. The pro rata algorithm, used for some tradable objects listed with LIFFE for example, splits all orders for the same price. The present invention is not limited to any particular type of order execution algorithm. It should also be understood that the price order queue is a term that covers a broad range of systems used by an exchange to conduct orderly financial transactions such as, for example, a FIFO system or a pro rata system.

Regardless of the type of order execution algorithm used, each exchange 102, 104, 106 preferably provides similar types of information in market updates found in their data feeds to subscribing client devices 108, 110, 112. Market information may include data that represents just the inside market. The inside market is the lowest sell price (best ask) and the highest buy price (best bid) at a particular point in time. Market information may also include market depth. Market depth refers to quantities available at the inside market and can also refer to quantities available at other prices away from the inside market. The quantity available at a given price level is usually provided by the host exchange in aggregate sums. The extent of the market depth available to a trader usually depends on the exchange. For instance, some electronic exchanges provide market depth for all (or most) price levels, some exchanges provide market depth for a finite number of price levels, while some exchanges provide only quantities associated with the inside market, and others may provide no market depth at all. Additionally, exchanges 102, 104, 106 can offer other types of market information, for example, the last traded price (LTP), the last traded quantity (LTQ), total traded quantity (TTQ), and order fill information. It should be understood that the present invention is not limited to receiving and analyzing a data feed consisting of market updates. One skilled in the art would recognize upon reading the description herein that the present invention has utility in any trading application where any particular type of data feed is provided.

B. Gateway

Gateways 114, 116, 118 are devices such as a mainframe, super minicomputer, minicomputer, workstation, or microcomputer that connect network 120 to networks 122, 124, 126 so that market information can be successfully passed between client devices 108, 110, 112 and exchanges 102, 104, 106. Gateways 114, 116, 118 receive market information from exchanges 102, 104, 106 and convert it to a form compatible with the protocols used by client devices 108, 110, 112 using conversion techniques known in the art. Also, as known by those skilled in the art, gateways 114, 116, 118 may have one or more servers to support the data feeds, such as a price server for processing price information, an order server for processing order information, and a fill server for processing fill information. A trader at one of client devices 108, 110, 112 can subscribe to price information, order information, and fill information for a particular market hosted at exchanges 102, 104, 106. Gateways 114, 116, 118 also receive transaction information, such as orders, order changes, queries, etc. from client devices 108, 110, 112 and forward that information to corresponding exchanges 102, 104, 106.

C. Client Device

Client devices 108, 110, 112 are devices that provide an interface for traders to trade at one or more markets listed with one, some, or all of exchanges 102, 104, 106. Some examples of client devices include a personal computer, laptop computer, hand-held computer, and so forth. Client devices 108, 110, 112, according to the preferred embodiments, include at least a processor and memory. The processor and memory, which are both well known computer components, are not shown in the Figure for sake of clarity. Preferably, the processor has enough processing power to handle and process the various types of market information. Of course, the more market information which is received and processed, the more processing power is preferred. However, any present day processor has enough capability to perform at least the most basic part of the present invention.

Memory may include computer readable medium. The term computer readable medium, as used herein, refers to any medium that participates in providing instructions to processor for execution. Such a medium may take many forms, including but not limited to, non-volatile media, volatile media, and transmission media. Non-volatile media includes, for example, optical or magnetic disks, such as storage device. Volatile media includes dynamic memory, such as main memory or RAM (random access memory). Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, and any other memory chip or cartridge, or any other medium from which a computer can read.

Client devices 108, 110, 112 receive market information from any of exchanges 102, 104, 106. According to the preferred embodiment, market information is displayed to the trader(s) on the visual output device or display device of client devices 108, 110, 112. The output device can be any type of display. For example, the display could be a CRT-based video display, an LCD-based or a gas plasma-based flat-panel display, a display that shows three-dimensional images, or some other type of display. The present invention is not limited to any particular type of display.

Upon viewing the market information or a portion thereof, a trader may wish to send orders to an exchange, cancel orders in a market, change orders in a market, query an exchange, and so on. To do so, the trader may input various commands or signals into the client device 104, for example, by typing into a keyboard, inputting commands through a mouse, or inputting commands or signals through some other input device. Upon receiving one or more commands or signals, client devices 108, 110, 112 preferably generate transaction information. For instance, a trader may click a mouse button to initiate an order to buy a tradable object. Then, transaction information would include an order to buy a particular quantity of the tradable object at a particular price. There are many different types of messages and/or order types that can be submitted, all of which may be considered various types of transaction information. Once generated, transaction information is sent from client device 104 to host exchange 102 over network(s) 120, 122, 124, 126.

Figure 2:
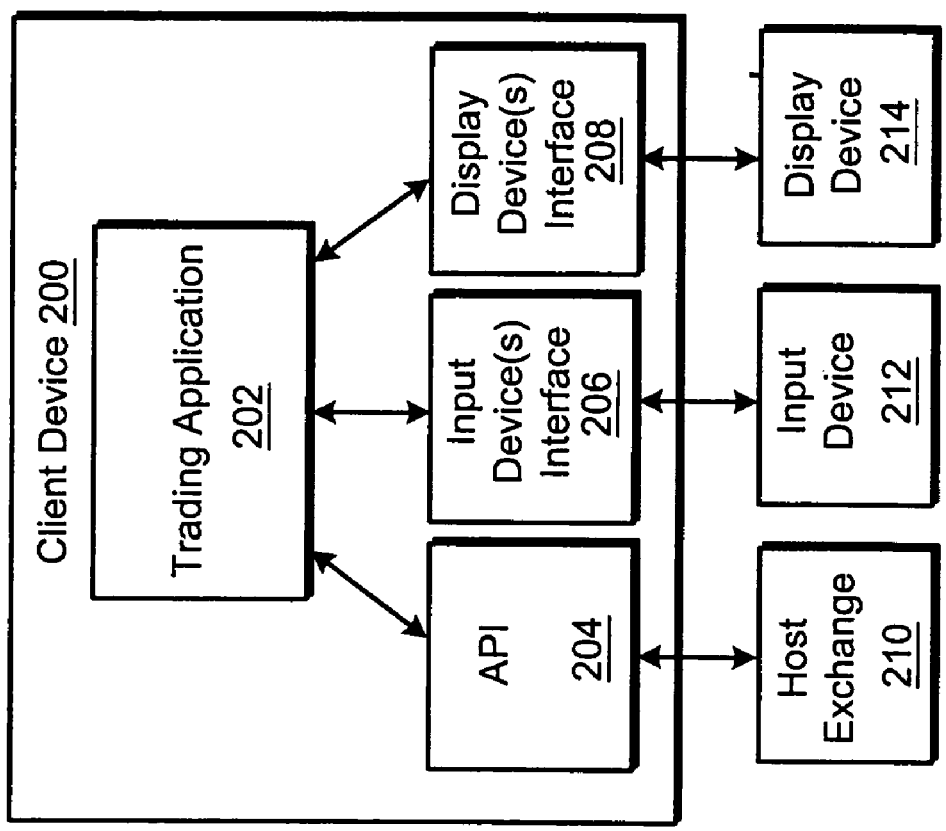
FIG. 2 illustrates an example system overview of a client device which is used to implement the preferred embodiments described herein.

FIG. 2 shows an overview of an example client device 200 which may be similar to the type of client devices 108, 110, 112 shown in FIG. 1. Client device 200 can be any particular type of computing device, examples of which were enumerated above with respect to the client devices. According to the preferred embodiments, client device 200 has trading application 202 stored in memory that when executed arranges and displays market information in many particular ways, usually depending on how the trader prefers to view the information. Trading application 202 may also implement the preferred embodiments described herein. Alternatively, the preferred embodiments described herein may occur elsewhere such as outside of trading application 202 on client device 200, on a gateway, or on some other computing device. Preferably, trading application 202 has access to market information through API 204 (or application programming interface) and trading application 202 can also forward transaction information to exchange 210 via API 204. Alternatively, API 204 could be distributed so that a portion of the API rests on the client device 200 and a gateway, or at the exchange 210. Additionally, trading application 202 may receive signals from input device 212 via input device interface 206 and can be given the ability to send signals to display device 214 via display device interface 208.

III. Order Queue Position Estimation

As previously described, exchanges can often provide data feeds with limited amounts of information. Such limited information provided by an exchange makes it more difficult for a trader to assess what is actually happening in a market, and in particular, makes it difficult to determine the priority of the trader's order(s) over other orders at the same price level.

According to the preferred embodiments, market updates in a data feed from any given exchange are preferably analyzed and the position of a trader's order or orders in one or more price order queues is estimated. In the preferred embodiments, the position of a trader's order in a price order queue is estimated such that it is certain to be first in the price order queue (next to be matched) when all of the estimated quantity/orders resting in front of it (if there are any) are matched. In other words, the trader's order may be matched sooner than what is estimated, but preferably the trader's order will not be matched later than what is estimated; this may also be referred to as the "worst case" as defined herein. The worst case order position estimation can be provided or displayed to the trader in any particular manner to assist him or her in making better and more informed trades.

A. When a Match has Occurred

When an incoming order arrives at an exchange, a matching engine attempts to match some or all of the incoming order, depending on its order size and what is available in the market, to quantity resting in the exchange order book. If quantities are matched, the exchange then publishes a market update that indicates a match has occurred. The market update would also provide the matched quantity and price. If an exchange provides only "snapshot" type updates such that last traded price (LTP) and last traded quantity (LTQ) are not provided in separate information packets, the snapshot types updates may be analyzed to determine if a match has occurred. According to a FIFO matching system, for example, the quantity that was previously resting in the exchange order book is removed from the price order queue and quantity (if any) in the price order queue advances towards the front of the queue.

Similarly, according to the preferred embodiments, when a match occurs, the quantity that was matched is preferably removed from the front of the trader's order queue to reflect the similar change at the exchange price order queue. In addition, when a match occurs, the trader's order or orders in the price order queue may advance towards the front of the queue by the amount that was traded.

In the preferred embodiments, the matched quantity and price can be found in a market update. For example, when a match occurs between two traders, both traders would receive a market update indicating a match has occurred. For those traders whose orders were not matched, a market update is broadcast indicating the last traded quantity (LTQ) and the last traded price (LTP). Of course, some exchanges might provide other ways of informing traders that a match has occurred, all of which may preferably be used to determine that a match has occurred.

Figure 3:
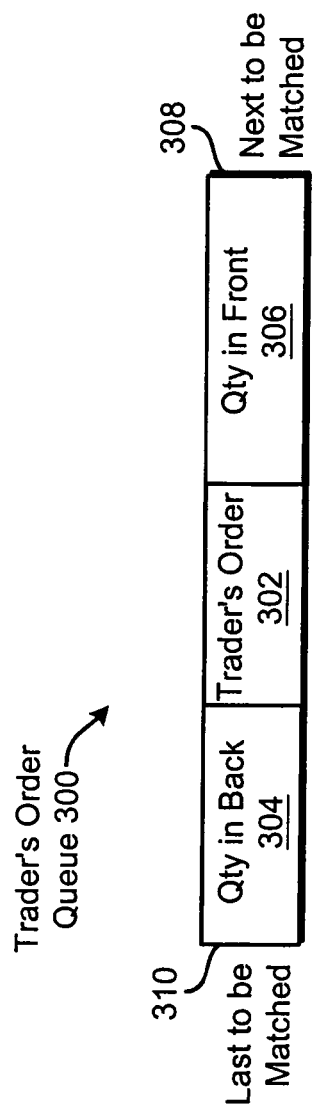
FIGS. 3-4 show graphical depictions of an order queue using the preferred embodiments; to estimate the trader's order position in the order queue.

Although order queue information is in electronic form, such as stored in computer memory, FIG. 3 attempts to graphically illustrate a trader's order queue 300 for purposes of explanation. Referring to FIG. 3, the quantity at the front 308 is next to be matched assuming the market moves to the price represented by the price order queue. The quantity at the back 310 is last to be matched. It should be understood that the term, trader's order queue, as used herein, refers to the estimation of the trader's order position relative to other orders (if there are other orders) in the price order queue at an exchange. The price order queue is a term covering any type of data structure and/or memory storage system used by an exchange to conduct orderly financial transactions such as, for example, a FIFO system or a pro rata system.

The order position estimation may be displayed in any particular fashion to the trader. For example, one particular way to graphically display the order position estimation is by trader's order queue 300 shown in FIG. 3 (or variations thereof). Then, for example, a trader's order queue like 300 could be displayed at each price level, or at least, at each price level where the trader using the software (and/or hardware) of the preferred embodiments has one or more working orders. Of course, there are virtually an unlimited number of ways to display such information to the trader.

Assume for purposes of illustration that a trader using the preferred embodiments places an order referred to as "trader's order" 302. Also, assume that there is quantity in front 306 of trader's order 302 and there is quantity in back 304 of trader's order 302. According to the preferred embodiments, matched quantity would be removed from the front 308 of the queue 300. In other words, quantity in front 306 would be reduced and trader's order 302 would advance in the trader's order queue 300. Quantity in back 304 would also advance towards the front 308 of the order queue 300.

B. A New Order is Added

If quantities are not matched the orders at the exchange are preferably sorted by price and time priority into the price order queue where the orders rest until they are matched by the matching engine or until the orders are deleted or changed by the trader, for example. Using a FIFO based system, the new order is placed at the back of the price order queue by the exchange's logic.

Referring to FIG. 3, assuming that a trader places an order. As such, the order would preferably be placed at the back 310 of the trader's order queue 300 to simulate what would happen at an exchange using a FIFO system.

C. Quantity is Added to an Existing Order

Sometimes, a trader may have an order resting in the price order queue and later wish to add quantity to the order. However, according to many exchanges, if quantity is added to an already existing order, then the order would lose its current queue position and go to the back of the price order queue. An exchange may then publish a market update to reflect the change. More specifically, the market update does not usually indicate that the quantity was added to an order, instead, the market update might only indicate the total aggregate quantity at that price.

To determine if more quantity has been added, the aggregate quantity in this recent market update may be compared with the aggregate quantity from a previous market update (e.g., stored in memory) to determine that an increase in aggregate quantity at that price has occurred. According to the preferred embodiments, only the increase in aggregate quantity is added to the back of the trader's order queue. The original order quantity is left in the trader's order queue where it was prior to the market update. Preferably, if a trader had one or more orders resting in the trader's order queue, they would not have advanced to the front of the queue.

Referring to FIG. 3, using the worst case approach, the increase in aggregate quantity would be added to the quantity in back 304. Under this scenario, trader's order 302 would not advance to the front of the queue because quantity in front 306 remained unchanged. It should be understood that because the trader using the preferred embodiments placed trader's order 302, any change to trader's order 302 would be known by the preferred system and therefore the system could adjust for it. For example, if the trader added quantity to trader's order 302, then the preferred system may move trader's order 302 (with the increased quantity) to the back 310 of the queue 300. The preferred system could also verify that trader's order 302 changed upon receiving confirmation from the exchange and/or via a market update indicating an increase in quantity equal to that of the increase in quantity for trader's order 302.

D. Quantity is Deleted from an Existing Order

Sometimes, a trader may have an order resting in the price order queue and later wish to delete quantity from the order. According to many exchanges, if quantity were deleted from an already existing order, the order would remain in its current queue position. An exchange may also publish a market update to reflect the change. More specifically, the market update does not usually indicate that quantity was deleted from an order, instead, the market update might indicate the total aggregate quantity at that price.

To determine if quantity has been deleted, the aggregate quantity in this market update may be compared with the aggregate quantity from a previous market update to determine that a decrease in aggregate quantity at that price has occurred. According to the preferred embodiments, the decrease in aggregate quantity is removed from the back of the trader's order queue.

Referring to FIG. 3, using the worst case approach, the decrease in aggregate quantity may be removed from quantity in back 304. If there is not enough quantity in back 304 to satisfy the decrease, then preferably, the remaining portion of the decrease is taken from quantity in front 306. Or, if there is no quantity in back 304, then preferably, the entire decrease is taken from quantity in front 306. Similarly, to adding quantity to an order, it should be understood that because the trader using the preferred embodiments placed trader's order 302, any change to trader's order 302 would be known and therefore the system could adjust for it. For example, if the trader deleted quantity from trader's order 302, then the system would preferably decrease the size of trader's order 302, but it would remain in the same queue position. The system could also verify the order change upon receiving confirmation from the exchange and/or via a market update indicating a decrease in quantity equal to that of the decrease in quantity for trader's order 302.

E. An Entire Order is Deleted

Similar to deleting quantity from an order, if an entire order was deleted from the exchange, a market update would only indicate a decrease in quantity at that price has occurred. According to the exchange, if an order was deleted from a price order queue, a market update may only indicate a decrease in aggregate quantity at that price has occurred.

To determine if less quantity is available at a price level than before, the aggregate quantity in this market update may be compared with the aggregate quantity from a previous market update to determine that a decrease in aggregate quantity at that price has occurred. Using the worst case approach, the decrease in aggregate quantity is removed from the back of the trader's order queue. Therefore, the preferred embodiments treat an entire order deletion the same as quantity deleted from an existing order.

Figure 4:
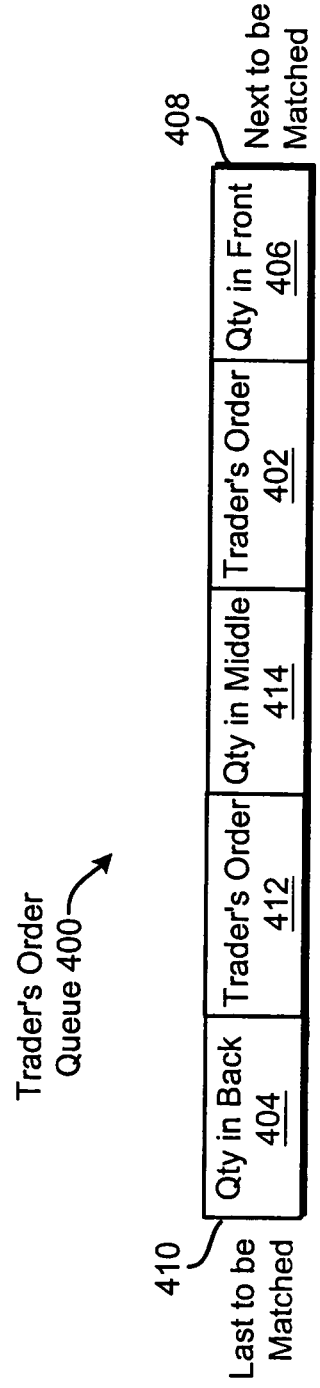

The same concepts may be applied when a trader has more than one "trader's order." Preferably, each "trader's order" in a trader's order queue is treated separately from one another. FIG. 4 attempts to graphically illustrate a trader's order queue 400 (which is similar to order 300 in FIG. 3). The quantity at the front 408 is next to be matched. The quantity at the back 410 is last to be matched. Assume this time that a trader using the preferred embodiments places orders referred to as "trader's order" 402 and "trader's order" 412. Also assume that there is quantity in front 406 of trader's order 402, a quantity in between trader's orders 402 and 412, and there is quantity in back 404 of trader's order 412.

Referring to FIG. 4, according to the preferred embodiments, the matched quantity would be removed from the front 408 of the queue 400. Then, trader's order 402, quantity in middle 414, trader's order 412, and quantity in back 404 would advance towards the front 408 of the order queue 400. An increase in aggregate quantity would be added to the quantity in back 404. Then, trader's orders 402 and 412 would not advance to the front of the queue because quantity in front 406 and quantity in middle 414 remain unchanged. A decrease in aggregate quantity (e.g., due to order change or an entire order deletion) would be removed from quantity in back 404. If there is not enough quantity in back 404 to satisfy the decrease, then preferably, the remaining portion of the decrease is taken from quantity in middle 414, and if there is not enough there, it would be taken from quantity in front 406. The preferred system can monitor and track as many "trader's orders" as necessary.

The preferred embodiments can be used with any particular exchange, and more specifically, can be implemented regardless if the exchange provides market updates for all price levels (or almost all price levels). For example, the LIFFE CONNECT application programming interface can provide market updates for "20" price levels above and "20" price levels below the inside market, which for all practical purposes may be considered as providing market updates for almost all price levels. If the exchange provides market updates for all price levels, or equivalently, for all price levels with activity (price levels with resting buy or sell orders), then trader's order queues can be created to replicate an exchange's price order queues for each of those price levels.

There are instances when an exchange provides market updates for only a limited number of price levels. For example, the CME application programming interface provides market updates for only "5" price levels above and "5" price levels below the inside market. In these instances, trader's order queues can be created to replicate an exchange's price order queues for only the provided price levels (e.g., "5" price levels above and "5" price levels below the inside market). Then, if the market moves away from a price level within that range, the system can preferably freeze the contents in the generated trader's order queue until the price level falls within that range again, or alternatively, the system may reset/erase the contents of the trader's order queue for that price level.

If the exchange does not provide market updates for all price levels, and a trader decides to put an order in at a price where such updates are not provided, the preferred system will preferably create a trader's order queue to hold that order. For example, the preferred system might put the order at the front of the trader's order queue, or alternatively, put the order behind quantity which might have existed before that particular price level went out of range. As the market moves towards that price level and the market updates are provided for that price, then the system preferably updates the trader's order queue to reflect any quantity which might be in the price order queue. For example, assume that a trader placed an order for "50" at "100," which is currently out of range for receiving market updates. Shortly after, assume that the market moves towards a price of "100" and the system now receives a market update indicating a quantity of "75" at the price "100" (our order of "50" and a quantity of "25" from one or more other market participants). According to the preferred embodiments, the our order is placed in the back of the trader's order queue and the remaining quantity (e.g., "25") is preferably placed in front of the queue.

IV. Displaying Order Position Estimation

Information regarding the trader's estimated order position may be displayed in any particular fashion and the present invention is not so limited to the manner in which such information is displayed. For example, the trader's estimated order position may be displayed using text to describe the trader's order position, numbers, graphically (e.g., such as shown in FIGS. 3 and 4), or through some other display choice.

The trader's order position could be as simple as displaying a number which corresponds to the estimated quantity in front of the order. For example, referring to FIG. 4, consider when quantity in front 406 is "45," trader's order 402 is "10," quantity in middle 414 is "25," trader's order 412 is "15," and quantity in back 404 is "0." Then, a number such as "45" may be displayed in association with trader's order 402 and a number such as "80" may be displayed in association with trader's order 412. Then, from viewing the numbers, the trader may easily determine that my order 402 is certain to be first in the order queue when "45" are filled (or deleted), and that my order 412 is certain to be first in the order queue when "80" are filled (or deleted).

Figure 10:
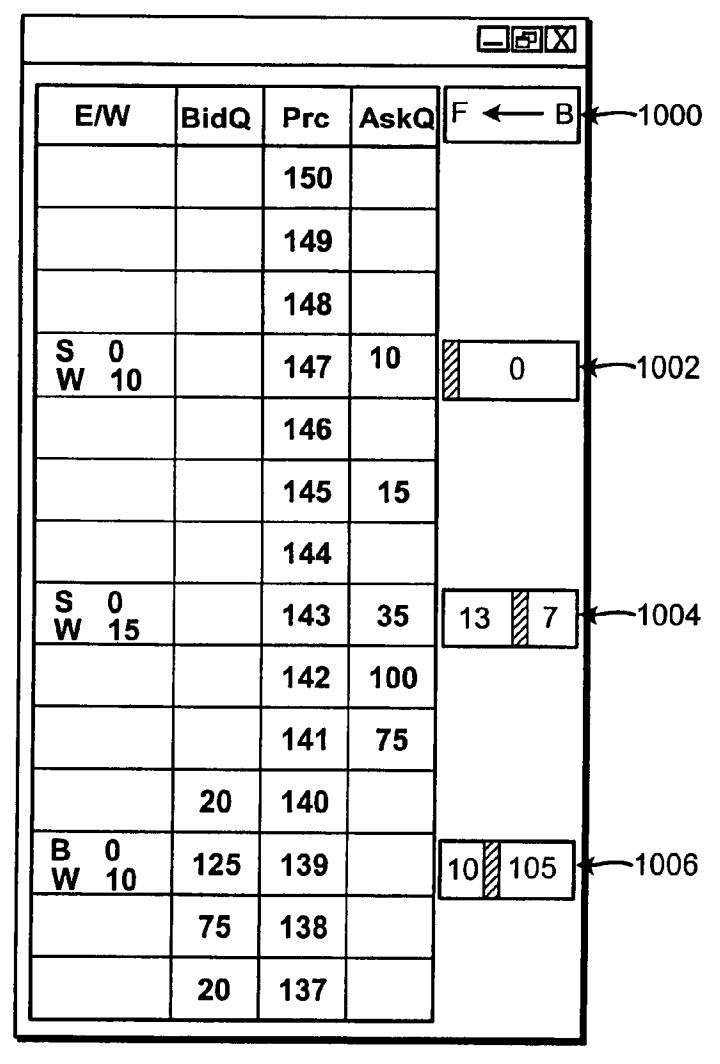

The trader's order position may be displayed graphically such as displayed in FIG. 4. For example, orders or quantity could be dynamically displayed in a graphical order queue. The orders or quantity, represented by blocks (or some other symbol, shape, or color), could move in the order queue depending on the order estimation. Each order queue may be displayed next to the corresponding price level. For example, the preferred embodiments may be utilized with a commercially available trading application and interface referred to as X_TRADER® from Trading Technologies International, Inc. of Chicago, Ill. X_TRADER® provides an electronic trading interface, referred to as MD Trader™, in which working orders and/or bid and ask quantities are displayed in association with a static price scale or axis. Then, trader's order queues may be displayed next to or near the corresponding price level. For example, referring to the trading window with a vertical price axis in FIG. 10, order estimation may be displayed next to the corresponding price levels that have working orders (or any other desired price level). Block 1000 is a guide that indicates the front of the queue by "F" and the back of the queue by "B." Queue 1002 shows the trader's sell order for "10" is estimated at the front of the exchange order queue for the price "147." Queue 1004 shows the trader's sell order for "15" is an estimated "13" back from the front of the exchange order queue for the price "143." Queue 1006 shows the trader's buy order for "10" is an estimated "10" back from the front of the exchange order queue for the price "139." Of course, FIG. 10 provides only an example, and the present invention is not limited to displaying order estimation in this manner.

Portions of the X_TRADER® and the MD Trader™ style display are described in U.S. patent application Ser. No. 09/590,692, entitled "Click Based Trading With Intuitive Grid Display of Market Depth," filed on Jun. 9, 2000, and U.S. patent application Ser. No. 09/971,087, entitled "Click Based Trading With Intuitive Grid Display Of Market Depth And Price Consolidation," filed on Oct. 5, 2001, the contents of both are incorporated by reference herein. It should be understood, however, that any trading screen, whether or not there is a static price scale, may be used with the present invention.

Although such details are not necessary to the present invention, the number of orders in the order queue could also be estimated and the size of the orders could be estimated in addition to tracking and monitoring the trader's order position. Recall that estimating order numbers and order sizes is described in the already incorporated in U.S. patent application Ser. No. 10/348,134, filed on Jan. 21, 2003, entitled, "Method and Apparatus for Providing Order Queue Information," the contents of which are incorporated herein by reference.

V. More Alternative Embodiments

The preferred embodiments estimate the trader's order position in such a way as to be certain that the order will be filled when the estimated quantity ahead of it (if any) gets filled. Traders may find this type of estimation to be desirable as it provides them with a "worst case" scenario. For example, if according to the preferred embodiments, a quantity of "45" is ahead of the trader's order, then the trader knows his or her order will be at the front of the price order queue at the exchange if, at a maximum, "45" get filled or deleted.

However, there are alternative ways to estimate order position that would attempt to provide other best guesses as to the trader's order position in the queue. The alternative approaches could be used together with the preferred embodiments, or instead, the alternative approaches could be used separately, whichever is more desirable to the trader. Examples of these approaches are described below with respect to an example shown in FIG. 5.

Figure 5:
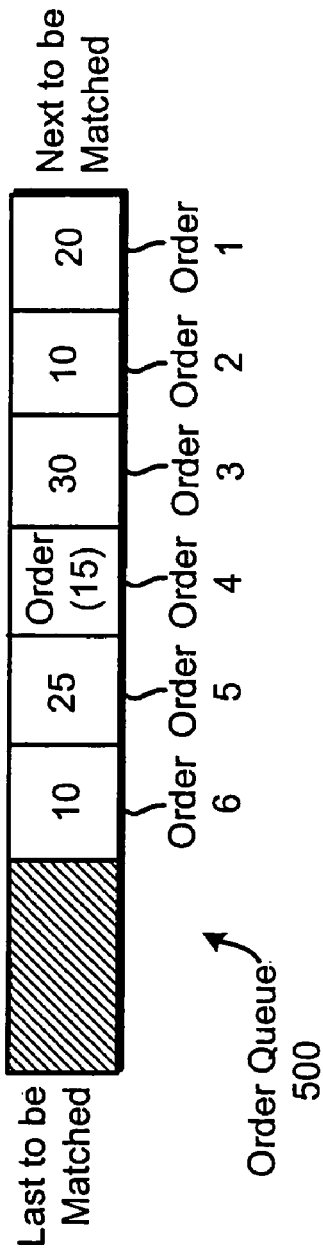

Referring to FIG. 5, assume that the order queue 500 contains orders for "20," "10," "30," "15" (trader's own order), "25," and "10." Therefore, the total estimated quantity is 110. For ease of explanation, let us refer to the orders as order 1 ("20"), order 2 ("10"), order 3 ("30"), order 4 ("15"), order 5 ("25"), and order 6 ("10").

Now, assume that a market update was received indicating an aggregate quantity of "100." This indicates a reduction in quantity by "10." Using techniques described in the above incorporated application, it may be determined that the decrease in quantity was not due to a match. If it was not due to a match, then there are several possibilities of what might have happened (assuming the trader did not change order 4). For example, "10" of order 1 might have been deleted, order 2 might have been deleted entirely, "10" of order 3 might have been deleted, "10" of order 5 might have been deleted, or order 6 might have been deleted entirely.

Figure 6:
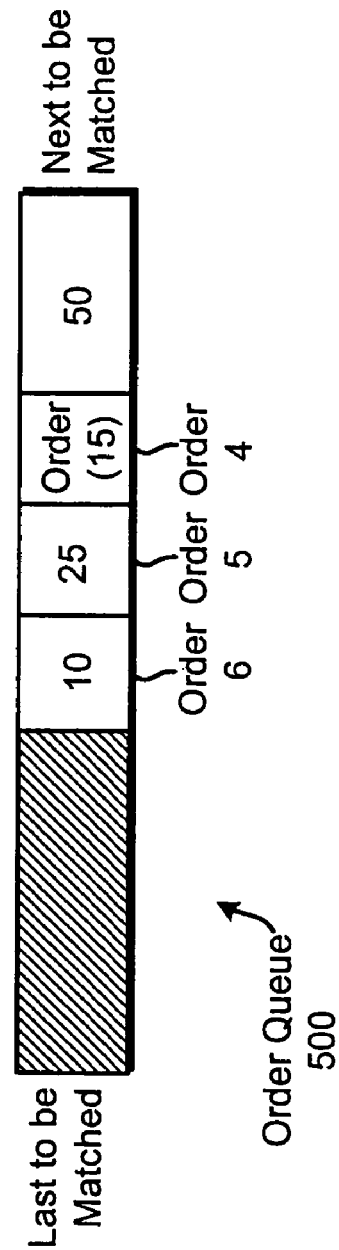

According to one embodiment (referred to herein as the "best case" for ease of explanation), it may be assumed that "10" of order 1 were deleted, order 2 was deleted, or "10" of order 3 were deleted (they would each give the same result). Then, order 4 (e.g., the trader's order) would advance in the order queue 600 by "10." FIG. 6 shows what order queue 500 might look like under the best case scenario given these example facts. Note that it is not necessary to distinguish between orders in the order queue 500. For example, FIG. 6 shows that "50" is ahead of order 4, instead of showing the actual number of orders ahead of order 4 as shown in FIG. 5. Sometimes, a trader may only be concerned about the actual quantity ahead of his or her order and he or she might not be so concerned about the actual number of orders in front of them. Alternatively, the orders could be distinguished based on an approximation using one of the approaches given in the above incorporated patent application.

Referring to the worst case scenario, which was described in the previous sections of this application, it may be assumed that order 6 was deleted or that 10 of order 5 were deleted (they would each give the same result). Then, order 4 would stay in the same position in the order queue 500. FIG. 7 shows what order queue 500 might look like in this example. As a result, "25" lots are shown after order 4. Order 4, however, has remained in the same queue position.

According to yet another embodiment which usually provides a result in between the best case and the worst case scenario (referred to herein as the "middle case" for ease of explanation), an algorithm of choice may be used to determine the position of order 4. Then, an indicator could be displayed to the trader that indicates where order 4 might be in the order queue based on the algorithm and current market trends, for instance. For example, one algorithm might split the difference between the results found using the best and worst approaches. The best case approach estimated that "50" is in front of order 4 and "35" is in back. The worst case approach estimated that "60" is in front of order 4 and "25" is in back. The middle case approach may split the difference such that "55" is in front of order 4 and "30" is in back. FIG. 8 shows what order queue 500 might look like using the middle case approach.

Yet, another algorithm might use statistics and historical data to determine the likelihood of why the quantity has been reduced. For example, historical data might show that in this particular market traders tend to delete full orders when they know that they are near the last in the order queue. Using this data and the probability of it occurring again, the algorithm might choose something similar to the worst case scenario where the order position has not changed because the last order was probably deleted. In other words, the algorithm might split the difference between the best case and the worst case, but it might weigh the order position more towards one approach over another.

Figure 9:
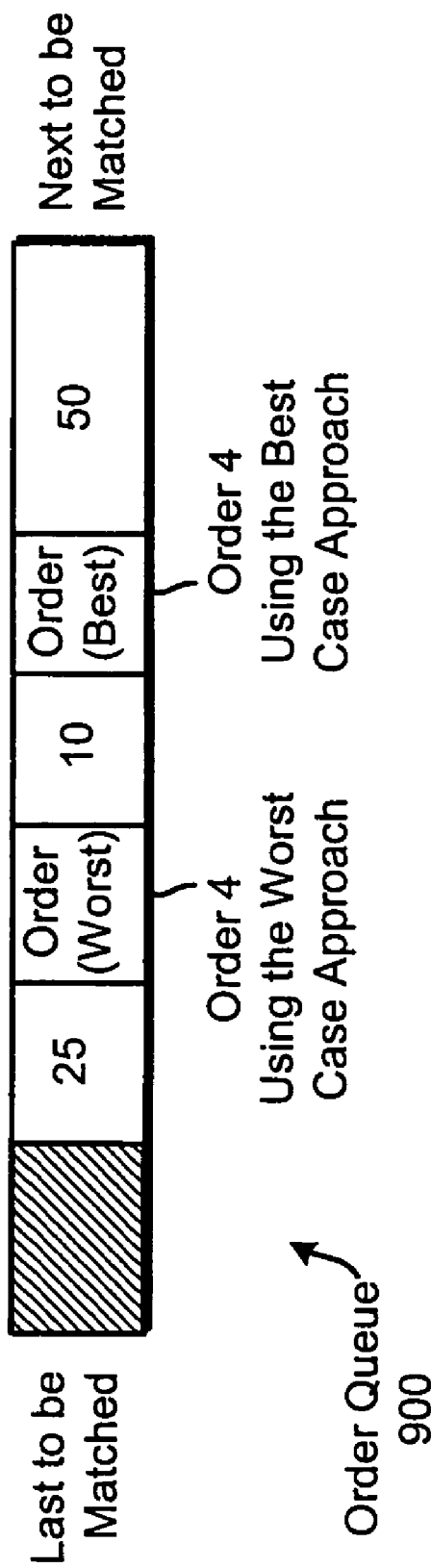

Information regarding the trader's estimated order position, whether the approach used was the best case, the worst case, or the middle case, may be displayed in any particular fashion. It is also possible to display information relating to the combination of best case, worst case, and/or the middle case or a range of possibilities. For example, if so desired, the estimation from both of the best case and the worst case order positions could be displayed to the trader. FIG. 9 shows a graphically illustrated trader's order queue 900 that displays the best case and worst case order positions in the same order queue. Recall that in the best case (e.g., referring to FIG. 6) there was 50 in front of order 4 and 35 behind order 4. Referring to FIG. 9, the order queue 900 similarly shows 50 in front of order 4 and 35 behind order 4. Recall that in the worst case (e.g., referring to FIG. 7) there was 60 in front of order 4 and 25 behind order 4. Referring again to FIG. 9, the order queue 900 similarly shows 60 in front of order 4 and 35 behind order 4. For sake of illustration, instead of showing the order estimation position graphically, the quantity ahead of the order (best) can be displayed, such as "60" and the quantity ahead of the order (worst) can be displayed, such as "50."

V. Conclusion

Traders may often want to characterize a market to the best of their abilities so that they can make more informed and desirable trades. To do this, the preferred embodiments can be used to analyze an exchange provided data feed and based on the analysis, an estimate of the trader's order position at an exchange can be determined. Then, the trader can concentrate on other things and not necessarily have to spend his or her own time guessing where his or her order is in the exchange order queue. An additional advantage of the preferred embodiments lies within its ability to display and represent an order queue for a tradable object at a given price level in a numerical manner, a graphical manner, or both a numerical and graphical manner. One skilled in the art would recognize these advantage and the many other advantages of knowing the position of a trader's orders in an order queue.

It should be understood that the programs, processes, methods and apparatus described herein are not related or limited to any particular type of computer or network apparatus (hardware or software), unless indicated otherwise. Various types of general purpose or specialized computer apparatus may be used with or perform operations in accordance with the teachings described herein. While various elements of the preferred embodiments have been described as being implemented in software, in other embodiments hardware or firmware implementations may alternatively be used, and vice-versa.

In view of the wide variety of embodiments to which the principles of the present invention can be applied, it should be understood that the illustrated embodiments are examples only, and should not be taken as limiting the scope of the present invention. For example, the steps of the flow diagrams may be taken in sequences other than those described, and more, fewer or other elements may be used in the block diagrams.

The claims should not be read as limited to the described order or elements unless stated to that effect. Thus, all variations that come within the scope and spirit of the following claims and equivalents thereto are claimed as the invention.

What is claimed is:

1. A method for estimating the priority of an order at an electronic exchange, the method comprising:
    sending from a computing device an order in a message with a price to an electronic exchange where the order is sorted according to the price into an order queue at the electronic exchange, wherein the order is an order to buy or sell a particular quantity of a tradable object;
    receiving at the computing device a market update pertaining to an order quantity pending in the order queue at a price for the tradeable object;
    displaying on a graphical user interface an indicator representing a position of the order at the price in the order queue in relation to other order quantities currently pending in the order queue;
    receiving at the computing device market updates wherein the market updates provide an updated order quantity at the price for the tradeable object pending in the order queue;
    analyzing at the computing device the updated order quantity provided in the market updates and estimating a new position of the order in the order queue; and
    updating at the computing device the indicator to reflect the new position of the order at the price in the order queue.

2. The method of claim 1, wherein the indicator is a number.

3. The method of claim 1, wherein the indicator is a graphical representation of the position of the order at the price in the order queue.

4. The method of claim 2, wherein the graphical representation comprises a separate indicator for order quantities in front of the order in the order queue.

5. The method of claim 4, wherein the graphical representation further comprises a separate indicator for order quantities behind the order in the order queue.

6. The method of claim 1, wherein the indicator represents a cumulative order quantity pending in front of the order in the order queue.

7. The method of claim 1, wherein the indicator represents individual orders pending in front of the order in the order queue.

8. The method of claim 1, wherein the order queue is processed by the electronic exchange so that orders are removed based on a first in, first out (FIFO) priority.

9. The method of claim 1, wherein the order queue is processed by the electronic exchange so that orders are removed based on a pro rata priority.

10. The method of claim 1, wherein the market updates provide information on changes comprising a last traded quantity, a new order is added in the order queue, a quantity is added to an order in the order queue, a quantity is deleted from an order in the order queue, or an order is deleted from the order queue.

11. The method of claim 1, wherein the market update comprises a total aggregate quantity available at the price.

12. The method of claim 1, wherein the market update comprises a last traded quantity at a last traded price.

13. The method of claim 1, wherein the step of estimating the position of the order comprises removing a quantity equal to a last traded quantity from the front of an estimated order queue when a match has occurred at the price.

14. The method of claim 1, wherein the step of estimating the position of the order comprises adding a quantity equal to the increase in quantity to the back of an estimated order queue when the quantity has decreased in the order queue at the price.

15. The method of claim 1, wherein the step of estimating the position of the order comprises removing a quantity equal to the last traded quantity from the back of an estimated order queue when quantity has decreased in the order queue at the price.

16. The method of claim 1, wherein the step of estimating the position of the order comprises removing a quantity equal to the decrease in quantity from the front of an estimated order queue when there is no quantity in the back of the estimated order queue.

17. The method of claim 1, wherein the step of estimating the position of the order comprises removing a quantity equal to the decrease in quantity from the front of an estimated order queue when quantity has decreased in the order queue at the price.

18. The method of claim 1, wherein the step of estimating the position of the order comprises a weighted combination of removing a quantity equal to a decrease in quantity from the back and from the front of an estimated order queue when the quantity has decreased in the order queue at the price.

19. The method of claim 1, wherein the indicator is displayed along a price axis in the graphical user interface.

* * * * *

UNITED STATES PATENT AND TRADEMARK OFFICE
CERTIFICATE OF CORRECTION

PATENT NO. : 7,882,012 B1  Page 1 of 1
APPLICATION NO. : 11/415890
DATED : February 1, 2011
INVENTOR(S) : Robert A. West et al.

It is certified that error appears in the above-identified patent and that said Letters Patent is hereby corrected as shown below:

Title Page at field (75) on the cover of the patent, please delete the phrase "Ryan A. Andrews" and add the phrase -- Ryan N. Andrews --

Signed and Sealed this
Twelfth Day of February, 2013

Teresa Stanek Rea
*Acting Director of the United States Patent and Trademark Office*